United States Patent Office 2,839,542
Patented June 17, 1958

2,839,542

QUATERNARY AMMONIUM SALTS OF AMINO-TRIPHENYLMETHANE ACETONITRILES

Lyman Chalkley, Prince Georges County, Md.

No Drawing. Application March 14, 1955
Serial No. 494,271

9 Claims. (Cl. 260—391)

This invention relates to a new and useful chemical compound, and more particularly to a hydrophilic dye cyanide.

An object of the invention is to provide a compound that is photosensitive when moistened with water or dissolved in water. The compound has the advantage over previously known basic triphenylmethane dye cyanides that it may be photochemically activated by water as well as by some organic materials. It finds useful applications in aqueous solutions suitable for actinometry, and in photographic and photoduplication processes.

The new compound has Formula No. 1, where A', B',

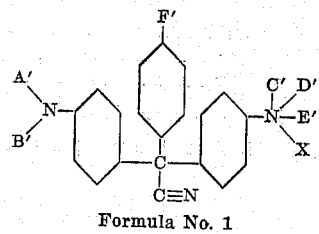

Formula No. 1

C', D' and E' are alkyl groups, X is an anion, and F' is chosen from the class of hydrogen and dialkylamino.

The compound may be prepared either by the action of an alkali cyanide on a triphenylmethane dye containing a quaternary ammonium group, or by the action of an alkylating agent on an aminotriphenylmethane dye cyanide. Examples of both processes are given below.

Example 1

To 12 g. of commercial ethyl green, Colour Index No. 685, in 300 ml. of water is added 100 ml. of 0.8 molar sodium carbonate solution. After 24 hours at room temperature the violet colored filtrate from the precipitated zinc carbonate is treated with 10 ml. of concentrated hydrochloric acid and then with 2 N hydrochloric acid to a pH of 3.5. The solution is heated to boiling, cooled immediately to room temperature and treated with 2.5 g. of 95% sodium cyanide in 25 ml. of water. After one day in the dark at room temperature the solution is treated with 50 ml. of a saturated solution of sodium chloride and allowed to stand in the dark for 12 days. The following operations are carried out in yellow light.

The solution is filtered: The brown precipitate, both that collected on the filter and adhering to the walls of the flask, is washed once with 5% sodium chloride solution, taken up in 55 ml. of N/2 hydrochloric acid and heated to boiling in the hood until all hydrogen cyanide has been driven off. After cooling, the acidity of the solution is adjusted to between pH 6 and 7 with sodium hydroxide, and hydrochloric acid if necessary. The solution is mixed with 50 ml. of a saturated solution of sodium chloride. After 1 day at 25° C. the precipitate is collected, washed with 25 ml. of 2% sodium chloride solution and dried in a 35° C. oven.

The crude dye cyanide obtained above is purified by solution in 10 times its weight of water at 85° C., filtration of the hot solution, and standing of the filtrate at room temperature in the dark for 1 month. The colorless microcrystals that form during this time are collected on a filter, washed with 10 ml. of ice water and dried in vacuo at room temperature over sulfuric acid.

The product has Formula No. 2. It is a white solid

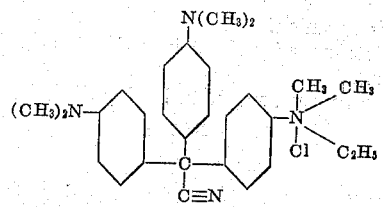

Formula No. 2 that dissolves in water, or alcohol, or acetic acid, to form a solution that is colorless in visible light but that becomes deep green on exposure to ultraviolet of wave lengths shorter than about 3400 A.

Another form of the compound, having Formula No. 3, may be prepared by a similar process from methyl green, Colour Index No. 684.

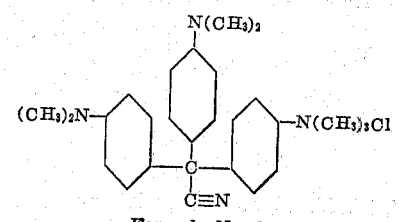

Formula No. 3

Example 2

A solution of 2.5 g. of malachite green cyanide (4,4'-bis-dimethylamino-triphenylacetonitrile) in 50 ml. of benzene and 1.64 g. of ethyl iodide is placed in a tightly closed flask and allowed to stand in the dark at room temperature for two years. The colorless crystals that formed during this time are collected, washed with benzene, and air dried to supply the compound with Formula No. 4.

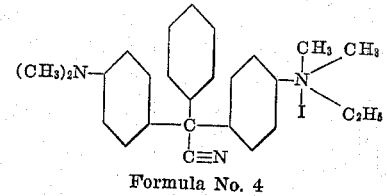

Formula No. 4

This compound is readily soluble in methyl alcohol and in acetonitrile. It is more sparingly soluble in water. In visible light all of these solutions are colorless. On exposure to ultraviolet radiation of wave lengths shorter than about 3200 A. the solutions color a deep yellow or orange. On removal from ultraviolet radiation the color fades slowly at room temperature. The faded solutions will color again on exposure to ultraviolet radiation, i. e., they are phototropic.

Example 3

The following is an alternative method for the preparation of the compound with Formula No. 4. A solution of 1.5 g. of malachite green cyanide, 0.37 ml. of ethyl iodide and 20 ml. of toluene is sealed in a glass tube and heated to 100° C. in the dark for 250 hours. The crystals that form are collected, washed with benzene and air dried.

The preparation of other forms of the invention by similar processes will be apparent to one skilled in the art.

I claim:
1. The chemical compound having the formula:

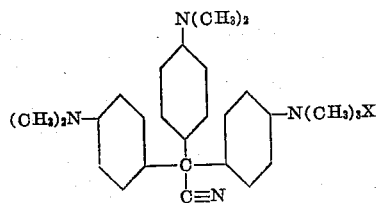

where X is an anion.

2. The compound defined in claim 1 wherein X is a chloride ion.

3. The chemical compound having the formula:

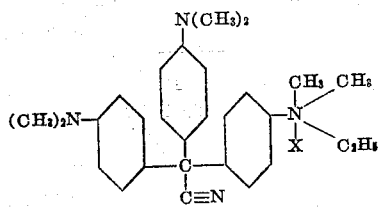

where X is an anion.

4. The compound defined in claim 3 wherein X is a chloride ion.

5. The chemical compound having the formula:

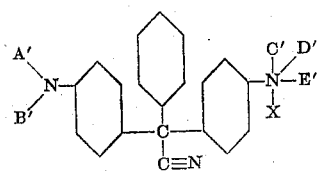

where A', B', C', D', and E' are lower alkyl groups and X is an anion.

6. The chemical compound having the formula:

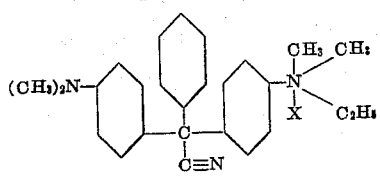

where X is an anion.

7. The compound defined in claim 6 wherein X is an iodide ion.

8. The chemical compound having the formula:

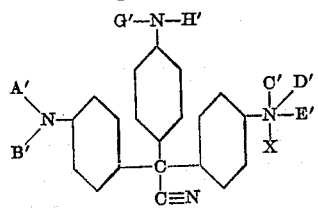

where A', B', C', D', E', G', and H' are lower alkyl groups and X is an anion.

9. The chemical compound having the formula:

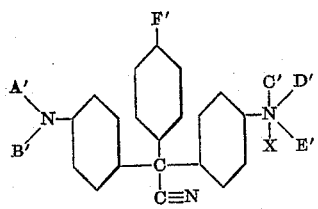

where A', B', C', D' and E' are lower alkyl groups, X is an anion and F' is a member of the group consisting of a di-lower alkylamino group and hydrogen.

References Cited in the file of this patent
UNITED STATES PATENTS

| | | |
|---|---|---|
| 43,066 | Hofmann | June 7, 1864 |
| 2,150,695 | Muehler | Mar. 14, 1939 |
| 2,366,179 | Chalkley | Jan. 2, 1945 |

OTHER REFERENCES

Schwartz et al.: Surface Active Agents (1949), pages 151 and 475.